United States Patent

Bataille et al.

[11] Patent Number: 6,116,388
[45] Date of Patent: Sep. 12, 2000

[54] SHOCK ABSORBER

[75] Inventors: Alain Bataille, Paris; Eric Charleux, Aubervilliers; Xavier Cousin, Courbevoie; Dominique Mennesson, Maisons-Alfort; Olivier Valee, Saint Germain en Laye, all of France

[73] Assignee: Delphi Technologies, Inc., Troy, Mich.

[21] Appl. No.: 09/306,327

[22] Filed: May 6, 1999

[30] Foreign Application Priority Data

May 7, 1998 [GB] United Kingdom .................... 9809594

[51] Int. Cl.[7] ........................................ F16F 9/34
[52] U.S. Cl. .................................. 188/282.6; 188/282.5; 188/322.15
[58] Field of Search ............... 188/282.1, 282.5, 188/282.6, 322.15

[56] References Cited

U.S. PATENT DOCUMENTS

| 4,460,074 | 7/1984 | Muller et al. ................. 188/322.14 |
| 4,485,900 | 12/1984 | Kato et al. ................. 188/282 |
| 4,895,229 | 1/1990 | Kato ................. 188/322.15 |
| 5,042,624 | 8/1991 | Furuya et al. ................. 188/322.15 |
| 5,115,892 | 5/1992 | Yamaoka et al. ................. 188/282 |
| 5,316,113 | 5/1994 | Yamaoka ................. 188/282 |
| 5,325,942 | 7/1994 | Groves et al. ................. 188/322.15 |

FOREIGN PATENT DOCUMENTS

| 0605400 | 5/1960 | Italy ................. 188/322.15 |
| 0086645 | 5/1982 | Japan ................. 188/322.15 |
| WO 92/16769 | 10/1992 | WIPO ................. 188/322.15 |

Primary Examiner—Chris Schwartz
Attorney, Agent, or Firm—Robert M. Sigler

[57] ABSTRACT

A shock absorber for a motor vehicle includes a compression stoke valve having one or more deflectable discs mounted on the piston on the rebound chamber side and a rebound stroke valve having one or more deflectable discs mounted on the piston on the compression chamber side. A compression flow passage extends through the piston, opening at one end into the compression chamber and having an opening at the other end into the rebound chamber which is closable by the deflectable disc or discs of the compression stroke valve. A rebound flow passage extends through the piston, opening at one end into the rebound chamber and having an opening at the other end into the compression chamber which is closable by the deflectable disc or discs of the rebound stroke valve. One or both valves further includes a flexible disc positioned between the deflectable disc or discs and the piston and extending partly across the associated passage to leave an opening in the passage. The deflectable disc adjacent the flexible disc has an aperture, and a gap is formed between the aperture in the deflectable disc and the flexible disc in the rest position to allow fluid flow from the associated passage through the opening, gap, and aperture. The flexible disc is sized to be capable of flexing and closing the aperture in the adjacent deflectable disc. The arrangement allows setting of different characteristics for low speed compression strokes when compared to low speed rebound strokes.

8 Claims, 1 Drawing Sheet

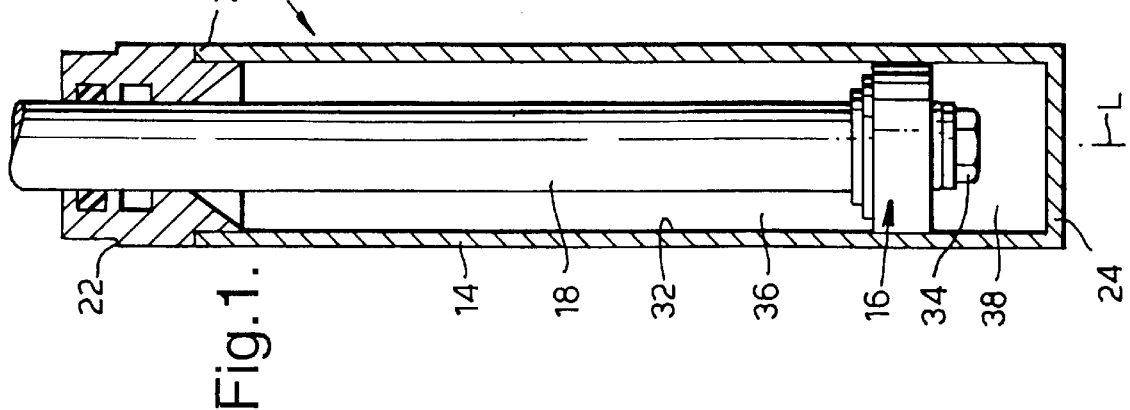

6,116,388

SHOCK ABSORBER

TECHNICAL FIELD

The present invention relates to a shock absorber for the suspension system of a motor vehicle.

BACKGROUND OF THE INVENTION

Known shock absorbers comprise a tube; a piston sealably slidably mounted in the tube and attached to a piston rod, the piston separating a compression chamber from a rebound chamber within the tube; a compression stroke valve mounted on the piston; and a rebound stroke valve mounted on the piston. The compression stroke valve acts as a one way valve to allow flow of fluid from the compression chamber to the rebound chamber through one or more compression flow passages in the piston during the compression stroke of the shock absorber. The rebound stroke valve acts as a one way valve which allows flow of fluid from the rebound chamber to the compression chamber through one or more rebound flow passages in the piston during the rebound stroke of the shock absorber. Typically, the valves comprise a number of discs which cover the flow passages during low speed strokes and which deflect to allow fluid flow during strokes above predetermined speeds. In order to allow fluid to flow between the rebound chamber and the compression chamber during low speed strokes, when the valve discs do not deflect, it is usual practise to form one or more apertures in the piston at the outer edge of the valve discs, or in the outer edge of the valve discs. These apertures open into the flow passages and the chambers to bypass the valve discs to allow fluid flow between the chambers during low speed strokes. Such an arrangement does not differentiate between a low speed rebound stroke and a low speed compression stroke, and will provide substantially the same effect during stroking in either direction.

SUMMARY OF THE INVENTION

It is an object of the present invention to provide a shock absorber having improved performance characteristics over the previously known arrangements.

The present invention is particularly for a shock absorber having a single tube (sometimes referred to as a monotube damper). The present invention may, however, be adapted for use in a shock absorber having an inner tube and an outer tube (sometimes referred to as a twin-tube damper).

A shock absorber in accordance with the present invention comprises a tube substantially closed at both ends and containing fluid; a piston slidably mounted in the tube and making a sealing fit therewith, the piston separating a compression chamber and a rebound chamber within the tube; a piston rod attached to the piston, having a longitudinal axis, and extending through the rebound chamber and out of one end of the tube; a compression stoke valve comprising one or more deflectable discs mounted on the piston on the rebound chamber side thereof; a rebound stroke valve comprising one or more deflectable discs mounted on the piston on the compression chamber side thereof; a compression flow passage extending through the piston in a direction substantially parallel to the longitudinal axis of the piston rod, opening at one end into the compression chamber, and having an opening at the other end into the rebound chamber which is closable by the deflectable disc or discs of the compression stroke valve; and a rebound flow passage extending through the piston in a direction substantially parallel to the longitudinal axis of the piston rod, opening at one end into the rebound chamber, and having an opening at the other end into the compression chamber which is closable by the deflectable disc or discs of the rebound stroke valve; wherein the compression stroke valve and/or the rebound stroke valve further comprises a flexible disc positioned between the deflectable disc or discs and the piston and extending across the associated passage to form an opening in the passage; wherein the deflectable disc adjacent the flexible disc has an aperture of predetermined size therethrough; wherein a gap is formed between the aperture in the deflectable disc and the flexible disc in the rest position of the deflectable disc or discs to allow fluid flow from the associated passage through the opening, gap, and aperture; and wherein the flexible disc is sized to be capable of closing the aperture in the adjacent deflectable disc on flexing of the flexible disc.

By determination of the size of the aperture, the required damping characteristics for the shock absorber can be obtained for low speed compression strokes (where the flexible disc is part of the rebound stroke valve), or for low speed rebound strokes (where the flexible disc is part of the compression stroke valve), or for both low speed compression and rebound strokes. The present invention therefore allows different effects or characteristics to be provided for the shock absorber between a low speed compression stroke and a low speed rebound stroke.

BRIEF DESCRIPTION OF THE DRAWINGS

The present invention will now be described, by way of example, with reference to the accompanying drawings, in which:

FIG. 1 is a schematic cross-sectional view of a shock absorber in accordance with the present invention; and FIG. 2 is an enlarged cross-sectional view of the piston assembly of the shock absorber of FIG. 1.

DESCRIPTION OF THE PREFERRED EMBODIMENT

Referring to the drawings, the shock absorber 10 shown in FIG. 1 is of the monotube damper type, and comprises a tube 14 having a longitudinal axis L, a piston assembly 16, a piston rod 18 having a longitudinal axis on axis L, and a rod guide 22. The piston assembly 16 will be described in greater detail below. The rod guide 22 may be any suitable conventional design well known to those skilled in the art, and will not be described in detail. The tube 14 is closed at one end 24, and is substantially closed at the other end 26 by the rod guide 22. The piston rod 18 extends through, and makes a sealing sliding fit with the rod guide 22. The piston assembly 16 makes a sealing sliding fit with the inner surface 32 of the tube 14. The piston rod 18 is secured to the piston assembly 16 by a nut 34 or any other suitable means. The piston assembly 16 divides the inner area of the tube 14 into a rebound chamber 36 and a compression chamber 38. The rebound and compression chambers 36 and 38 are substantially filled with fluid to damp reciprocating movement of the piston assembly 16 and piston rod 18 along axis L relative to the tube 14. The shock absorber 10 is mounted in a motor vehicle (not shown) in any suitable manner, and is part of the suspension system (not shown) for the motor vehicle.

The piston assembly 16 is shown in greater detail with reference to FIG. 2. FIG. 2 shows the piston 42 of the piston assembly 16 with an annular seal 44 made from Teflon material or any other suitable material. The piston 42 is preferably formed from sintered steel. The annular seal 44 provides a surface which makes a sealing sliding fit with the inner surface 32 of the tube 14. The piston 42 is substantially annular and has at least one passage 60 (which defines a compression flow passage) which passes through the piston 42. On assembly of the piston assembly 16 to the piston rod 18, the passage 60 extends in a direction substantially parallel to the axis L. Radially inward of the passage 60, at least one passage 62 (which defines a rebound flow passage) also passes through the piston 42. On assembly of the piston assembly 16 to the piston rod 18, the passage 62 extends in a direction substantially parallel to the axis L. The piston 42 has an end surface 58 directed towards the rebound chamber 36 and an end surface 52 directed towards the compression chamber 38. The passages 60, 62 open through the end surfaces 58, 52.

In addition to the piston 42 and seal 44, the piston assembly 16 comprises a compression stroke valve 64 and a rebound stroke valve 66. The compression stroke valve 64 comprises a flexible disc 80, a number of deflectable discs 82,84,86 and a retaining washer 88, all of which are substantially annular. On assembly, the flexible disc 80 is positioned adjacent the end surface 58 of the piston 42, and the deflectable discs 82, 84, 86 are positioned between the flexible disc and the retaining washer 88. The retaining washer 88 engages a shoulder 48 on the piston rod 18. The deflectable disc 82 adjacent the flexible disc 80 is sized to cover the compression flow passage 60 through the piston 42 and has an aperture 90 of predetermined size which aligns with the passage 60. The flexible disc 80 is sized to leave an opening 92 of predetermined size at the radially outer edge (relative to the axis L) of the passage 60, but with a diameter large enough to cover the aperture 90. In the rest position of the deflectable discs 82–86, a gap 94 of predetermined size is left between the aperture 90 in the deflectable disc 82 and the flexible disc 80. The gap 94 is formed by an annular shoulder 96 formed in the end surface 58 of the piston 42, the deflectable disc 82 engaging the shoulder in the rest position such that the deflectable disc has a convex shape. Alternatively, or additionally, the gap 94 may be formed by positioning an annular spacer (not shown) between the deflectable disc 82 and the flexible disc 80. The aperture 90, opening 92, and gap 94 form a restricted flow passage between the compression flow passage 60 and the rebound chamber 36. In the rest position, the flexible disc 80 lies in a plane which is substantially perpendicular to the axis L. The flexible disc 80 and the deflectable discs 82–86 have an aperture 50 therethrough which aligns with, and has a similar diameter to, the rebound flow passage 62 in the piston 42 to allow substantially unrestricted fluid flow between the passage 62 and the rebound chamber 36.

The rebound stroke valve 66 comprises a flexible disc 68, a number of deflectable discs 70, 72, 74, and a retaining washer 76, all of which are substantially annular. On assembly, the flexible disc 68 is positioned adjacent the end surface 52 of the piston 42, and the deflectable discs 70, 72, 74 are positioned between the flexible disc and the retaining washer 76. The retaining washer 76 is positioned adjacent the nut 34 on the end of the piston rod 18. The flexible disc 68, deflectable discs 70, 72, 74 and retaining washer 76 are sized so as not to cover the compression flow passage 60 to allow substantially unrestricted fluid flow between the passage 60 and the compression chamber 38. The deflectable disc 70 adjacent the flexible disc 68 is sized to cover the rebound flow passage 62 through the piston 42 and has an aperture 98 of predetermined size which aligns with the passage 62. The flexible disc 68 is sized to leave an opening 100 of predetermined size at the radially outer edge (relative to the axis L) of the passage 62, but with a diameter large enough to cover the aperture 98. In the rest position of the deflectable discs 70–74, a gap 102 of predetermined size is left between the aperture 98 in the deflectable disc 70 and the flexible disc 68. The gap 102 is formed by an annular shoulder 104 formed in the end surface 52 of the piston 42, the deflectable disc 70 engaging the shoulder in the rest position such that the deflectable disc has a convex shape. Alternatively, or additionally, the gap 102 may be formed by positioning an annular spacer (not shown) between the deflectable disc 70 and the flexible disc 68. The aperture 98, opening 100, and gap 102 form a restricted flow passage between the rebound flow passage 62 and the compression chamber 38. In the rest position, the flexible disc 68 lies in a plane which is substantially perpendicular to the axis L.

On compression stroke of the shock absorber 10, fluid flows from the compression chamber 38 into the compression flow passage 60. For compression strokes of low force or low speed, the flexible disc 80 bends to close the aperture 90 and the fluid flows from the compression chamber 38 through the aperture 98, gap 102, and opening 100 into the passage 62, and then through the aperture 50 into the rebound chamber 36. For compression strokes of larger force, the deflectable discs 82–86 can deflect away from the annular shoulder 94 to allow a larger flow of fluid through the compression flow passage 60.

On rebound stroke of the shock absorber 10, fluid flows from the rebound chamber 36 through the aperture 50 into the rebound flow passage 62. For rebound strokes of low force or low speed, the flexible disc 68 bends to close the aperture 98, and the fluid flows from rebound chamber 36 through the aperture 90, gap 94, and the opening 92 into the passage 60 and then into the compression chamber 38. For rebound strokes of larger force, the deflectable discs 70–74 can deflect away from the annular shoulder 104 to allow a larger flow of fluid through the rebound flow passage 62.

As mentioned above, the aperture 90, opening 92, and gap 94 form a restricted flow passage between the compression flow passage 60 and the rebound chamber 36. The size of the aperture 90 in particular, and also preferably the size of the opening 92 and the gap 94, is determined to provide the required damping characteristics during low speed rebound strokes. Also as mentioned above, the aperture 98, opening 100, and gap 102 form a restricted flow passage between the rebound flow passage 62 and the compression chamber 38. The size of the aperture 98 in particular, and also preferably the size of the opening 100 and the gap 102, is determined to provide the required damping characteristics during low speed compression strokes. The thickness and flexibility of the flexible discs 80,68 is also predetermined to produce the required damping characteristics during low speed strokes.

The number and size (thickness) of the deflectable discs 70–74, 82–86 is predetermined dependent on the required damping characteristics of the shock absorber 10. Additional flexible discs 68, 80 may be used in the rebound stroke valve 66 and compression stroke valve 64. Annular spacers (not shown) may be positioned between the flexible discs 68, 80 and the adjacent end surface 52, 58 of the piston 42 to further affect the flexibility of the flexible discs.

The rebound stroke valve 66 may be replaced by a rebound stroke valve of known design, with just the compression stroke valve 64 having the features of the flexible disc 80, aperture 90, opening 92, and gap 94. Alternatively, the compression stroke valve 64 may be replaced by a compression stroke valve of known design, with just the rebound stroke valve 66 having the features of the flexible disc 68, aperture 98, opening 100 and gap 102.

What is claimed is:

1. A shock absorber comprising a tube substantially closed at both ends and containing fluid; a piston slidably mounted in the tube and making a sealing fit therewith, the piston separating a compression chamber and a rebound chamber within the tube; a piston rod attached to the piston, having a longitudinal axis, and extending through the rebound chamber and out of one end of the tube; a compression stoke valve comprising one or more deflectable discs mounted on the piston on the rebound chamber side thereof; a rebound stroke valve comprising one or more deflectable discs mounted on the piston on the compression chamber side thereof; a compression flow passage extending through the piston in a direction substantially parallel to the longitudinal axis of the piston rod, opening at one end into the compression chamber, and having an opening at the other end into the rebound chamber which is closable by the deflectable disc or discs of the compression stroke valve; and a rebound flow passage extending through the piston in a direction substantially parallel to the longitudinal axis of the piston rod, opening at one end into the rebound chamber, and having an opening at the other end into the compression chamber which is closable by the deflectable disc or discs of the rebound stroke valve; wherein the compression stroke valve and/or the rebound stroke valve further comprises a flexible disc positioned between the deflectable disc or discs and the piston and extending across the associated passage to form an opening in the passage; wherein the deflectable disc adjacent the flexible disc has an aperture of predetermined size therethrough; wherein a gap is formed between the aperture in the deflectable disc and the flexible disc in the rest position of the deflectable disc or discs to allow fluid flow from the associated passage through the opening, gap, and aperture; and wherein the flexible disc is sized to be capable of closing the aperture in the adjacent deflectable disc on flexing of the flexible disc.

2. A shock absorber as claimed in claim 1, wherein the opening is at the radially outer edge of the associated passage relative to the longitudinal axis.

3. A shock absorber as claimed in claim 1, wherein the aperture aligns with the associated passage.

4. A shock absorber as claimed in claim 1, wherein the flexible disc has a diameter insufficient to close the associated passage but sufficient to close the aperture in the deflectable disc or discs when flexed into full contact therewith by fluid flow through the associated passage.

5. A shock absorber as claimed in claim 1, wherein the gap is formed by an annular shoulder on the piston which is engaged by the deflectable disc in the rest position of the deflectable disc such that the deflectable disc has a convex configuration relative to the flexible disc.

6. A shock absorber as claimed in claim 5, wherein the opening is at the radially outer edge of the associated passage relative to the longitudinal axis.

7. A shock absorber as claimed in claim 5, wherein the aperture aligns with the associated passage.

8. A shock absorber as claimed in claim 5, wherein the flexible disc has a diameter insufficient to close the associated passage but sufficient to close the aperture in the deflectable disc or discs when flexed into full contact therewith by fluid flow through the associated passage.

* * * * *